UNITED STATES PATENT OFFICE.

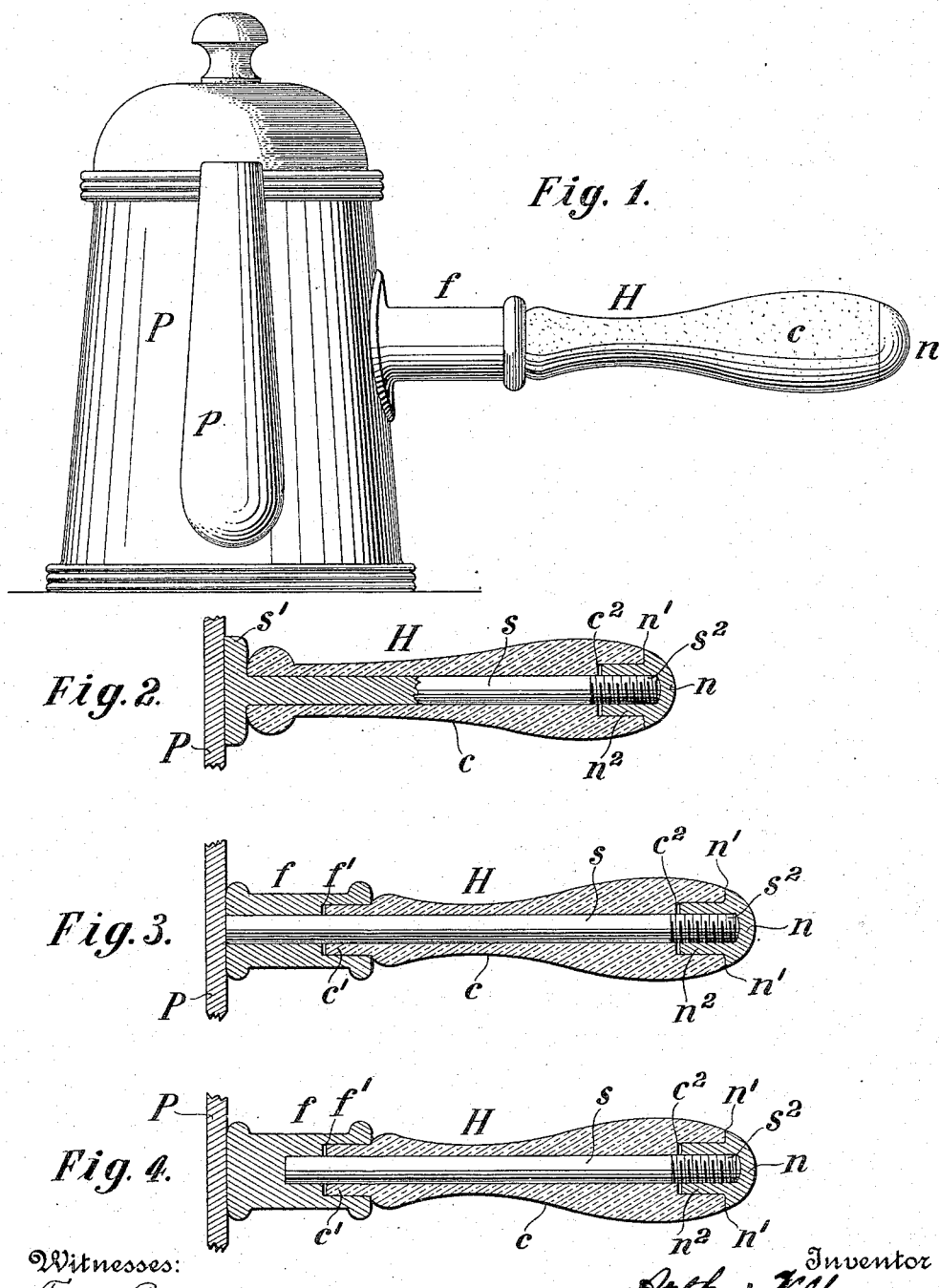

ARTHUR WOLFERMAN, OF NEW YORK, N. Y.

HANDLE FOR COFFEE-POTS AND SIMILAR UTENSILS.

1,168,772.  Specification of Letters Patent.  Patented Jan. 18, 1916.

Application filed April 17, 1915.  Serial No. 21,945.

*To all whom it may concern:*

Be it known that I, ARTHUR WOLFERMAN, a citizen of the United States, and a resident of the borough of Manhattan, city, county, and State of New York, have invented certain new and useful Improvements in Handles for Coffee-Pots and Similar Utensils, of which the following is a specification.

My invention although applicable to the handles of utensils of various kinds is especially designed for use in conjunction with metallic coffee and similar pots where the parts of the handles intended for immediate contact with the hand are made of wood, or some other suitable material adapted to act as a non-conductor of heat.

As heretofore constructed the non-conductive portion of the handle has proved to be the weakest portion of the utensil, being subjected to severe strain in use generally and exposed to injurious contact with extraneous objects. Furthermore when made of wood, as is ordinarily the case, especially in the cheaper grades of utensils, the non-conductive portion of the handle deteriorates very rapidly under alternating conditions of moisture (as in washing, &c.,) heat and dryness, resulting in shrinkage, splitting, &c., so that even when riveted to the metallic part of the handle the non-metallic part soon works loose or breaks off, necessitating the discarding of the utensil or its return to the maker or repairer for the purpose of refitting.

The main object of my invention is to obviate these difficulties by reinforcing the non-conductive portion of the handle, so that it will stand the strain and last longer in use, and at the same time provide means whereby said non-conductive portion of the handle may be quickly and conveniently removed, discarded, and replaced by a new hand-contact portion, all as hereinafter fully set forth and claimed specifically,—a distinctive feature of the invention consisting in the provision of a threaded core rod rigidly affixed to the utensil and by means of which the non-conductive hand-contact portion of the handle may be securely but detachably nut-locked to the utensil.

In the accompanying drawings, Figure 1, is an elevation of a demi-tasse coffee pot provided with my improved handle; Fig. 2, is a sectional elevation in detail of the handle and part of the utensil showing the core rod attached directly to the latter; Fig. 3, a similar view in which a metallic socket piece is used and both it and the core rod are attached directly to the side of the utensil; Fig. 4, a similar view in which the socket piece is attached directly to the utensil and the core rod to the socket piece.

I herein show and describe my invention as applied to a coffee pot of the "demi-tasse" type such as used in restaurants, hotels, &c., as it is particularly designed and adapted for such use, although obviously my improved form of handle may be applied to other utensils with like result and without departing from the principle of construction involved. Thus P, represents a coffee pot or any other similar or desired utensil, $p$, being the spout thereof. The handle H, is attached rigidly to the side of the pot, preferably by soldering thereto as is the usual custom in the manufacture of this class of goods, although other means of fastening may be resorted to,—the essential feature of my structure being the provision of the threaded core rod or stud $s$, and the securing nut $n$, by means of which the sleeve $c$, constituting the contact portion of the handle H, is detachably secured in position. For instance the axial stud $s$, may be rigidly secured directly to the side of the utensil as illustrated in Figs. 2, and 3, or indirectly thereto through the medium of the socket piece or ferrule $f$. In the first instance, as in Fig. 2, the inner end of the stud $s$, is preferably formed with a lateral enlargement, base or flange $s'$, to afford ample bearing surface in contact with the side of the utensil, P, to which it is supposed to be soldered, whereas in Fig. 3, the inner end of the ferrule $f$, performs the same function as the lateral enlargement $s'$, of the stud $s$, both stud and ferrule being soldered to the side of the utensil P; while in Fig. 4, the ferrule $f$, only is soldered or otherwise secured to the utensil, and the stud $s$, to the ferrule. In any case the outer end of the stud $s$, is formed with a screw thread $s^2$, for engagement with the securing nut $n$.

Where the ferrule member $f$, of the handle H, is omitted, as in Fig. 2, the contact sleeve $c$, extends down to the lateral base or flange $s'$, of the axial stud $s$, and the annular shoulder $n'$, on the retaining nut $n$, binds the contact sleeve $c$, between it and said lateral elargement $s'$, of the stud.

When the ferrule member $f$, is used as has heretofore been customary in such handles, said ferrule is formed with a socket $f'$, for reception of the contracted inner end $c'$, of the contact sleeve $c$. In either case the contact sleeve $c$, is preferably formed with a recess or mortise $c^2$, for the reception of the contracted portion $n^2$,—the outer end of the nut $n$, being preferably closed and dome-shaped from the annular shoulder $n'$, outward to afford a finished appearance, and isolate, protect, and conceal the threaded end $s^2$, of the stud $s$, as illustrated in elevation in Fig. 1, by reference to which it will be seen that the handle may thus be made symmetrical and attractive in appearance externally, notwithstanding the use of the axial reinforcing stud $s$, and cap nut $n$, which latter being presumably of metal, affords an agreeable contrast to the material of which the contact sleeve $c$, is composed. As before intimated this contact sleeve $c$, may be made of wood (usually), fiber, ebony, bone, or any other desired material having the requisite strength, and of relatively low heat conductivity to afford protection to the hand of the user of the utensil when the latter is hot. And since the stud $s$, acts as an effective reinforcement to said contact sleeve $c$, material may be used that would not otherwise be available on account of brittleness, lack of tenacity or strength, since the stud $s$, sustains the strain and stress of use, and the contact sleeve $c$, simply acts as a protector for the hand. But perhaps the most important function of the reinforcing stud $s$, and cap nut $n$, is the provision of simple but effective means whereby one contact sleeve may be quickly and conveniently substituted for another without the aid of skilled labor,—the design being to furnish a suitable number of extra contact sleeves $c$, with each consignment of pots or utensils, so that it will be unnecessary as heretofore to send the utensil to the repair shop or to the manufacturer in order to remedy a defect in so far as the handle is concerned.

The distinctive feature of my new structure of handle being the threaded reinforcing stud $s$, for sustaining the contact sleeve $c$, it is obvious that the cap nut $n$, might be dispensed with and the contact sleeve $c$, itself formed with a female screw thread for engagement directly with the thread on the stud $s$, without departing from the scope or spirit and intent of my invention in this respect. In any case the "nut" or female thread affords an effective means whereby the contact sleeve $c$, may be detachably secured to the reinforcing stud $s$, not only as originally applied thereto, but also to compensate for shrinkage of the contact sleeve.

What I claim as my invention and desire to secure by Letters Patent is,

1. In combination with a cooking utensil of the character designated, a handle therefor comprising a recessed ferrule having an extended bearing surface engaging the wall of said utensil and a threaded reinforcing stud rigidly attached to the utensil, a contact sleeve of relatively low heat conductivity fitting on said stud and formed at its inner end to fit into the recess in the ferrule and also formed with a recess in its outer extremity, and a cap screw engaging the thread on the stud and fitting in the recess in the outer end of the contact sleeve, for the purpose described.

2. A cooking utensil, a laterally projecting stud, means at one end of said stud having an extended bearing surface rigidly attached to the outer wall of the utensil, a contact sleeve on said stud and engaging said means, and a cap nut at the other end of said stud and having a shoulder engaging the adjacent end of the said sleeve.

ARTHUR WOLFERMAN.

Witnesses:
 GEO. WM. MIATT,
 DOROTHY MIATT.

Copies of this patent may be obtained for five cents each, by addressing the "Commissioner of Patents, Washington, D. C."